MACHINE FOR BEADING SILVER CHLORIDE PLATES

Filed April 23, 1946 8 Sheets-Sheet 1

INVENTORS: E. W. GENT
W. W. WERRING
BY I. MacDonald
ATTORNEY

Dec. 23, 1952 E. W. GENT ET AL 2,622,271

MACHINE FOR BEADING SILVER CHLORIDE PLATES

Filed April 23, 1946 8 Sheets-Sheet 2

INVENTORS: E. W. GENT
W. W. WERRING
BY I. MacDonald
ATTORNEY

Dec. 23, 1952 E. W. GENT ET AL 2,622,271

MACHINE FOR BEADING SILVER CHLORIDE PLATES

Filed April 23, 1946 8 Sheets-Sheet 3

INVENTORS: E. W. GENT
W. W. WERRING

BY I. MacDonald

ATTORNEY

Dec. 23, 1952 E. W. GENT ET AL 2,622,271

MACHINE FOR BEADING SILVER CHLORIDE PLATES

Filed April 23, 1946 8 Sheets-Sheet 4

INVENTORS: E. W. GENT
W. W. WERRING
BY I. MacDonald
ATTORNEY

MACHINE FOR BEADING SILVER CHLORIDE PLATES

Filed April 23, 1946 8 Sheets-Sheet 5

INVENTORS: E. W. GENT
W. W. WERRING
BY J. MacDonald
ATTORNEY

INVENTORS: E. W. GENT
W. W. WERRING
BY I. MacDonald
ATTORNEY

INVENTORS: E. W. GENT
W. W. WERRING
BY J. MacDonald
ATTORNEY

MACHINE FOR BEADING SILVER CHLORIDE PLATES

Filed April 23, 1946 8 Sheets-Sheet 8

INVENTORS: E. W. GENT
W. W. WERRING
BY J. MacDonald
ATTORNEY

Patented Dec. 23, 1952 2,622,271

UNITED STATES PATENT OFFICE 2,622,271

MACHINE FOR BEADING SILVER CHLORIDE PLATES

Edgar W. Gent, Morristown, N. J., and Walter W. Werring, New York, N. Y., assignors to Bell Telephone Laboratories, Incorporated, New York, N. Y., a corporation of New York Application April 23, 1946, Serial No. 664,386

5 Claims. (Cl. 18—1)

This invention relates to a machine for use for embedding glass beads into a sheet of silver chloride or like material used in sea water batteries generally known as duplex type, the glass beads serving as a dielectric between the anode and cathode of each plate assembly.

The object of this invention is the provision of a machine of the type above referred to, which will be simple in construction, rapid in the embedding of the beads in the silver chloride material, and positive in operation.

Figure 1:
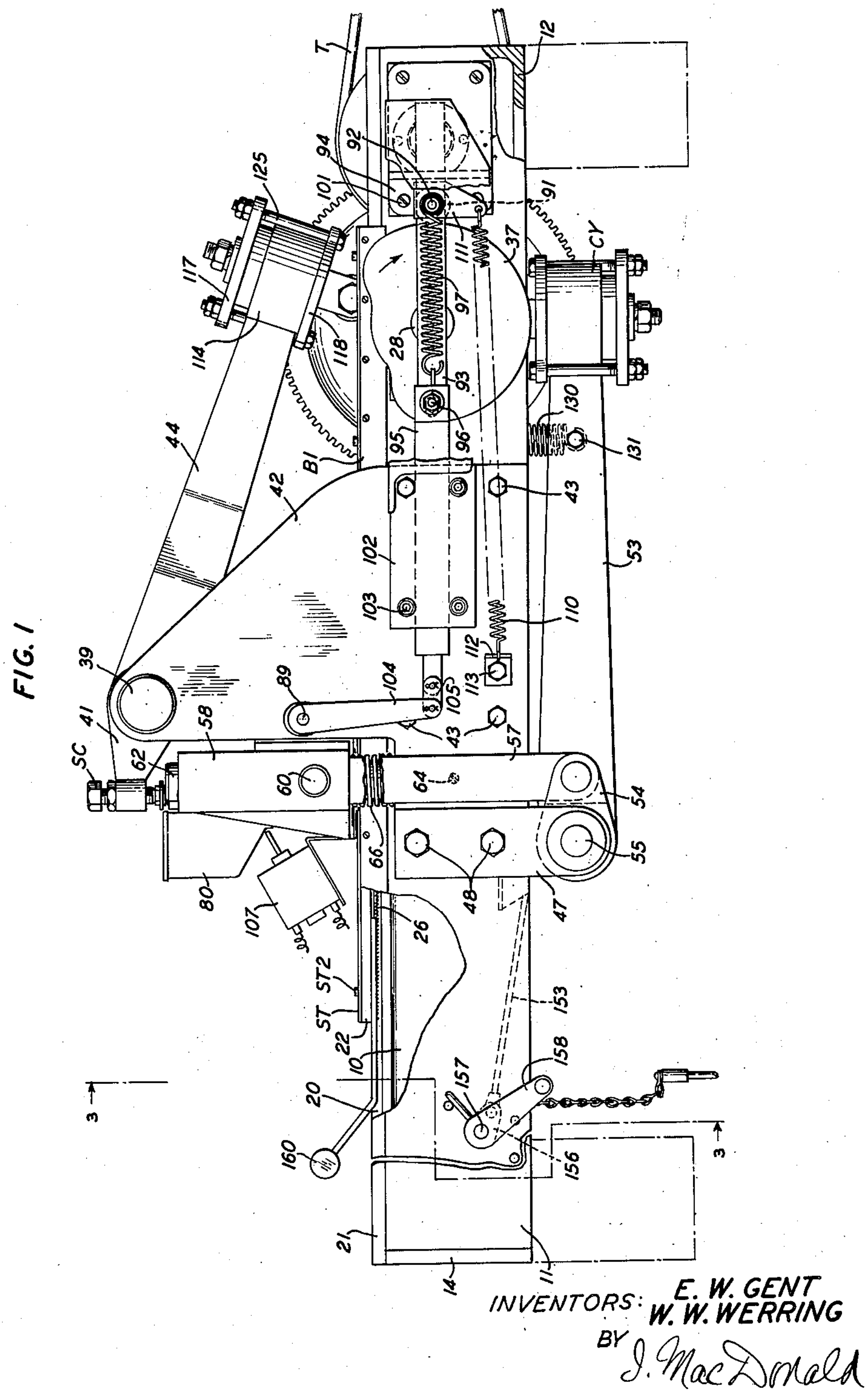
Fig. 1 is a side elevation view shown with a number of operating parts with portions broken away.
Figure 2:
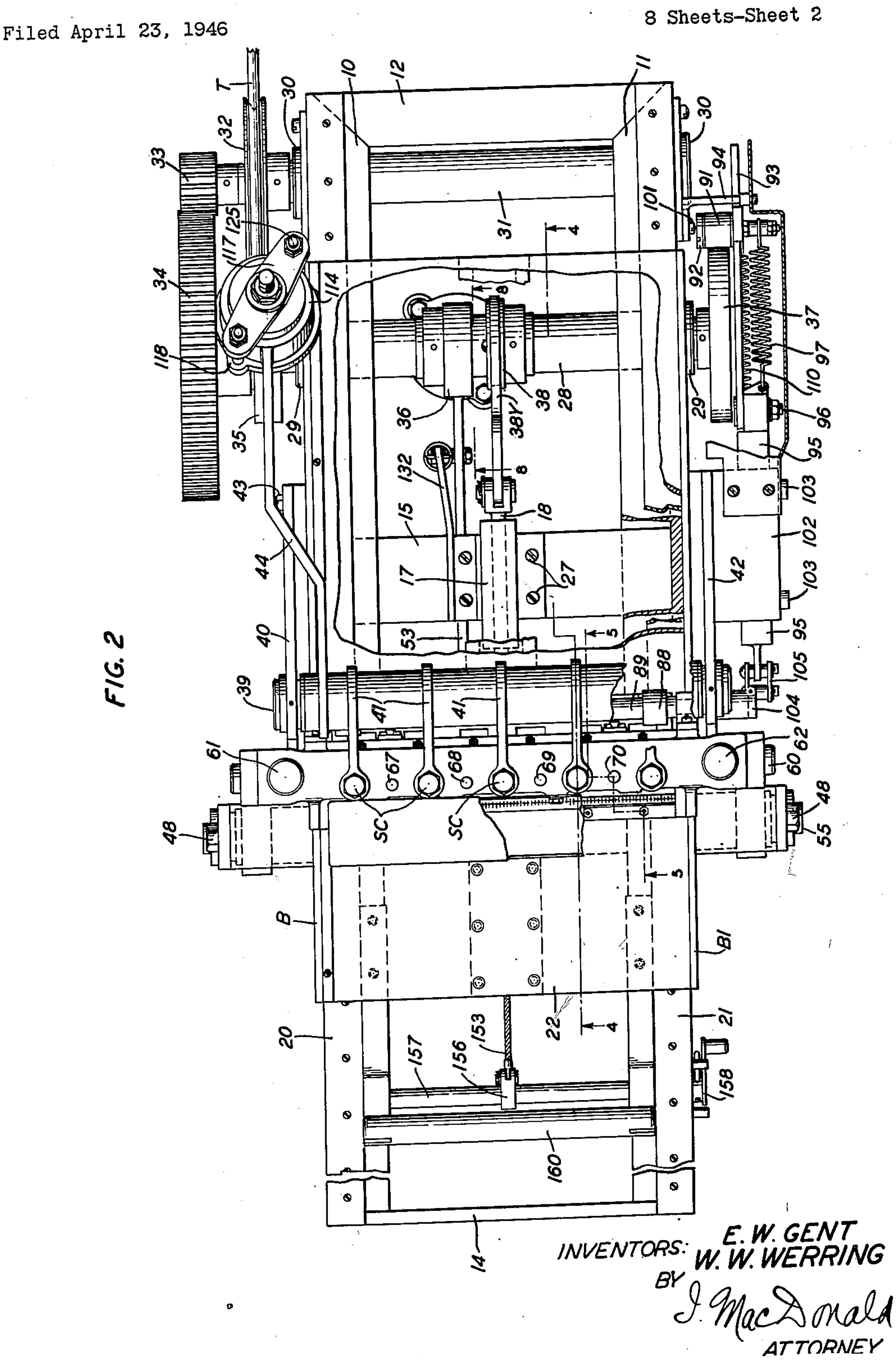
Fig. 2 is a top view of the mechanism shown in Fig. 1 with a number of operating parts with portions broken away.
Figure 4:
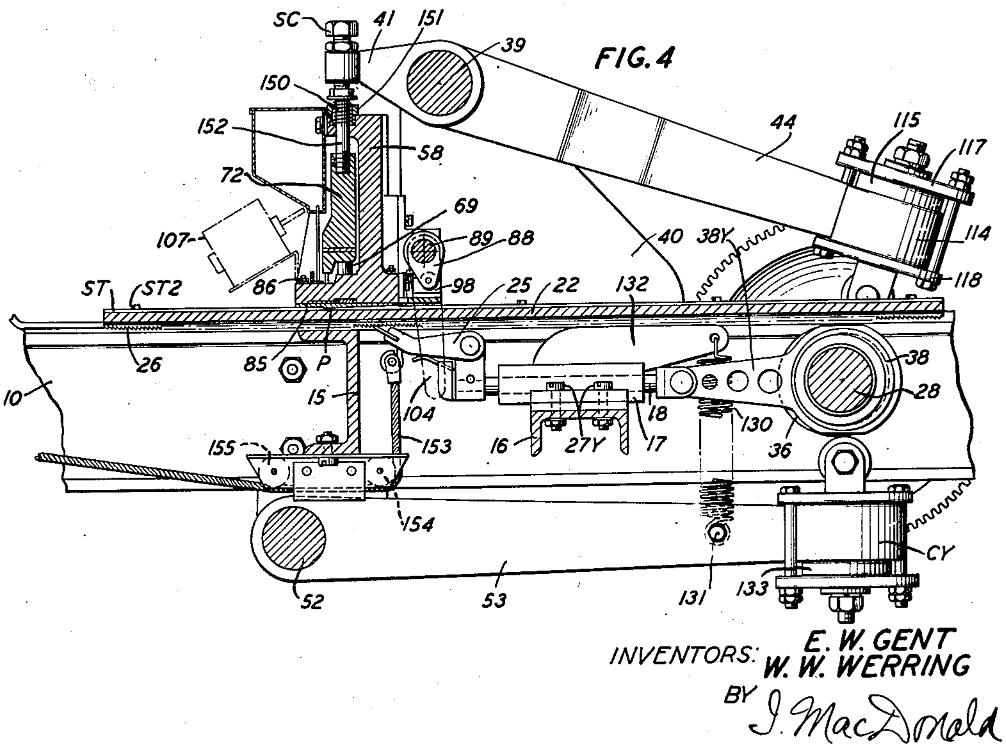
Fig. 4 is a vertical longitudinal section taken on line 4—4 of Fig. 2.

As shown in the drawing, the beading machine of this invention consists of a mounting frame formed of two rails 10 and 11 of channel-shaped cross-section held in parallel relation at one of their ends by a transversely disposed channel-shaped cross-piece 12, best seen in Figs. 1 and 2, secured thereto, as by welding, and at their opposite ends by a spacer bar 14 also secured, as by welding, to the rails 10 and 11, while at their middle length portion these rails are held in spaced relation by two rails pieces 15 and 16, best seen in Fig. 4, of channel-shaped cross-section welded at their ends to the rails 10 and 11. The bar 16, as best seen in Figs. 2 and 4, serving as a support for a guiding member 17 secured thereon by a number of screws 27Y into which a connecting rod 18 is mounted for longitudinal reciprocating movement as effected by an eccentric mechanism which will be hereinafter described in detail.

Figure 3:
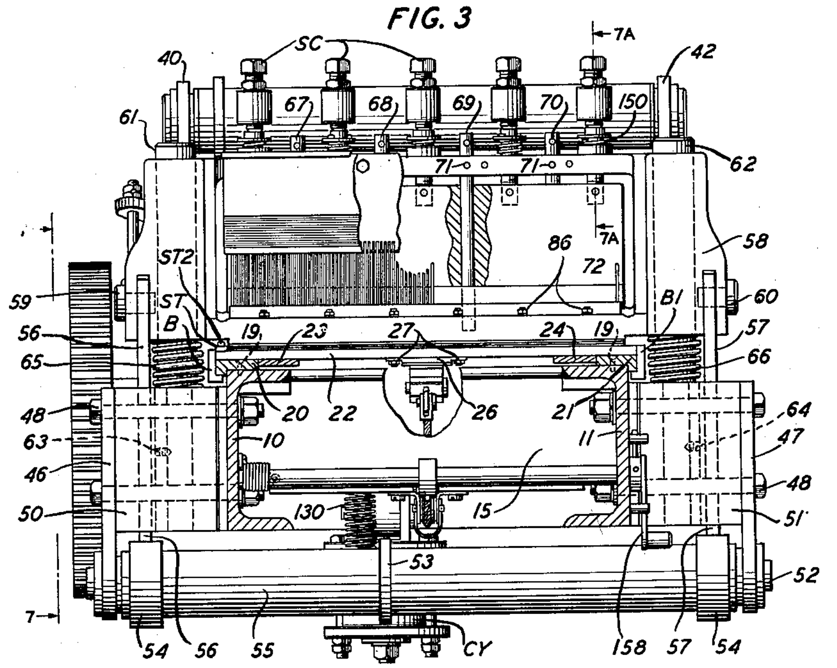
Fig. 3 is a vertical cross-sectional view taken on line 3—3 of Fig. 1.

On rails 10 and 11 and in parallel relation thereto are secured, as by a number of screws 19, the bars 20 and 21 of L-shaped cross-section, best seen in Fig. 3, on which a plate or table 22 rests. A pair of bars 23 and 24 are secured to the underside of table 22 longitudinally thereof for cooperation with the bars 20 and 21 for guiding the table in a longitudinal movement as imparted by a ratchet mechanism consisting of a spring-pressed pawl 25 carried by the connecting rod 18 and engaging a saw-toothed rack 26 secured to the underside of table 22 by a number of screws 27.

To the longitudinal edges of table 22 are secured the bars B and B1 of L-shaped cross-section to serve as guides for the table 22 in addition to the parallelly disposed bars 23 and 24 secured to the underside of table 22 while strip ST, best seen in Figs. 1, 3 and 4, is mounted on the table 22 along its left disposed longitudinal edge to serve for clamping the silver chloride plate on the table, as by a plurality of screws ST2.

The rails 10 and 11 are provided with similar bearings 29, best seen in Fig. 2, in which is journaled a shaft 28 and a pair of bearings 30 in which is journaled a shaft 31, the latter shaft having a pulley 32 keyed thereon operatively connected to a motor (not shown) as by a belt T for rotating the shaft 31 and thereby a pinion 33 keyed thereon. Pinion 33 meshes with a gear 34 keyed on shaft 28 for rotating this shaft and the cams 35, 36 and 37 and the eccentric 38 having its connecting rod 38Y operatively connected to the rod 18 actuating the pawl 25. The rotation of cam 35 is effective to impart a small angular movement to a lever member 44 and thereby to a shaft 39 on which are keyed a plurality of similarly shaped arms 41 each provided with an adjustable screw SC for adjusting the operation of a slider member 72, as will be hereinafter described in detail.

Shaft 39 is journaled in bearings formed with supporting plates 40 and 42 secured to the rails 10 and 11 by a plurality of bolts 43, best seen in Fig. 1.

Rectangularly shaped blocks 50 and 51, best seen in Fig. 3, are clamped between the rails 10 and 11 and downwardly extending plates 46 and 47 by the tightening action of a plurality of bolts 48. The plates 46 and 47 are provided with bearings in which is journaled a shaft 52 on which is secured, as by welding, a lever member 53 and a pair of arms 54 to the free ends of which are pivoted the link members 56 and 57, best seen in Figs. 1 and 3, having their opposite ends connected to a head piece 58 by pivots 59 and 60, the head piece 58 being mounted for sliding movement on vertically disposed guiding rods 61 and 62 having reduced portions at their lower disposed ends fitted in similarly sized holes in the blocks 46 and 47 and held in position therein by set screws 63 and 64, respectively, retractile springs, as 65 and 66, being provided for yieldably holding the head piece 58 to the non-operated position, as shown in Figs. 1, 3 and 5.

Figure 5A:
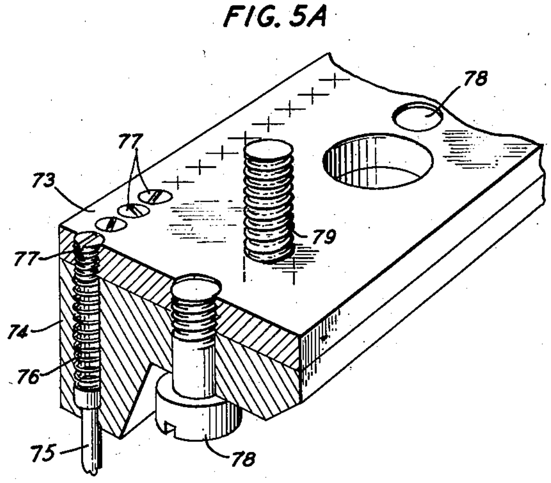
Fig. 5A is a perspective view of the plunger assembly enlarged shown with a number of parts in vertical section.
Figure 7A:
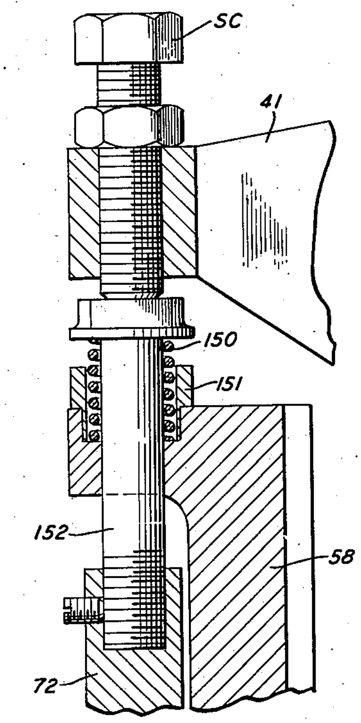
Fig. 7A is a partial view of the head piece mounting and that of the slider element and their operative connections.
Figure 12:
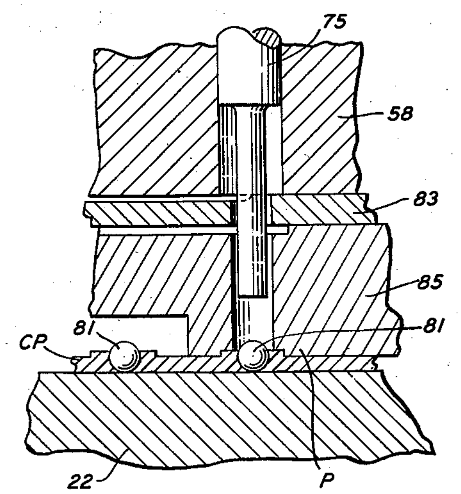
Fig. 12 is a view, enlarged, of one of the plunger members in position following the embedding of a glass bead into the silver chloride material.
Figure 5:
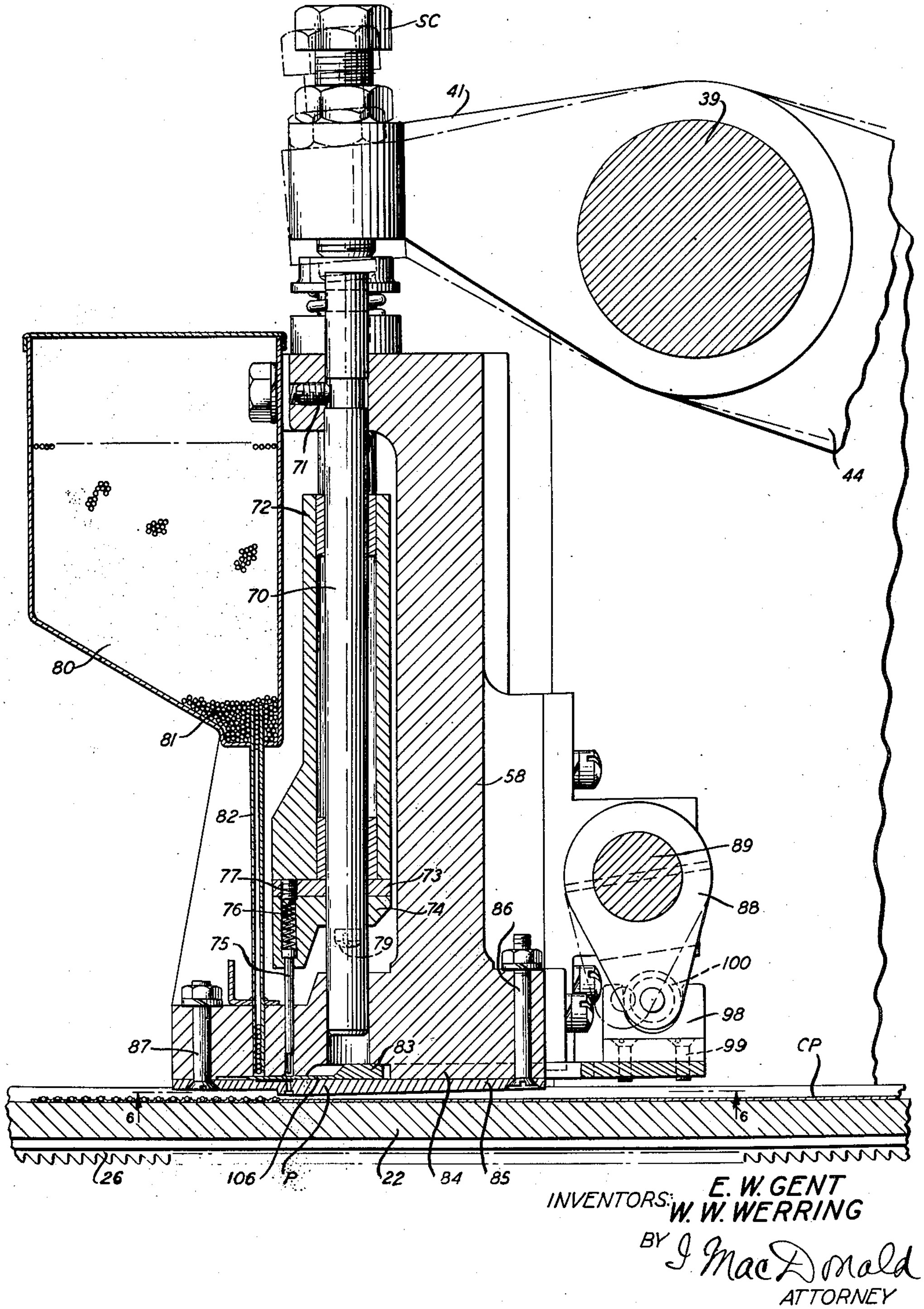
Fig. 5 is a partial view shown in longitudinal vertical section taken on line 5—5 of Fig. 2 showing plunger members operable for forcing the beads into the silver chloride material, such plunger members being shown in normal position.
Figure 6:
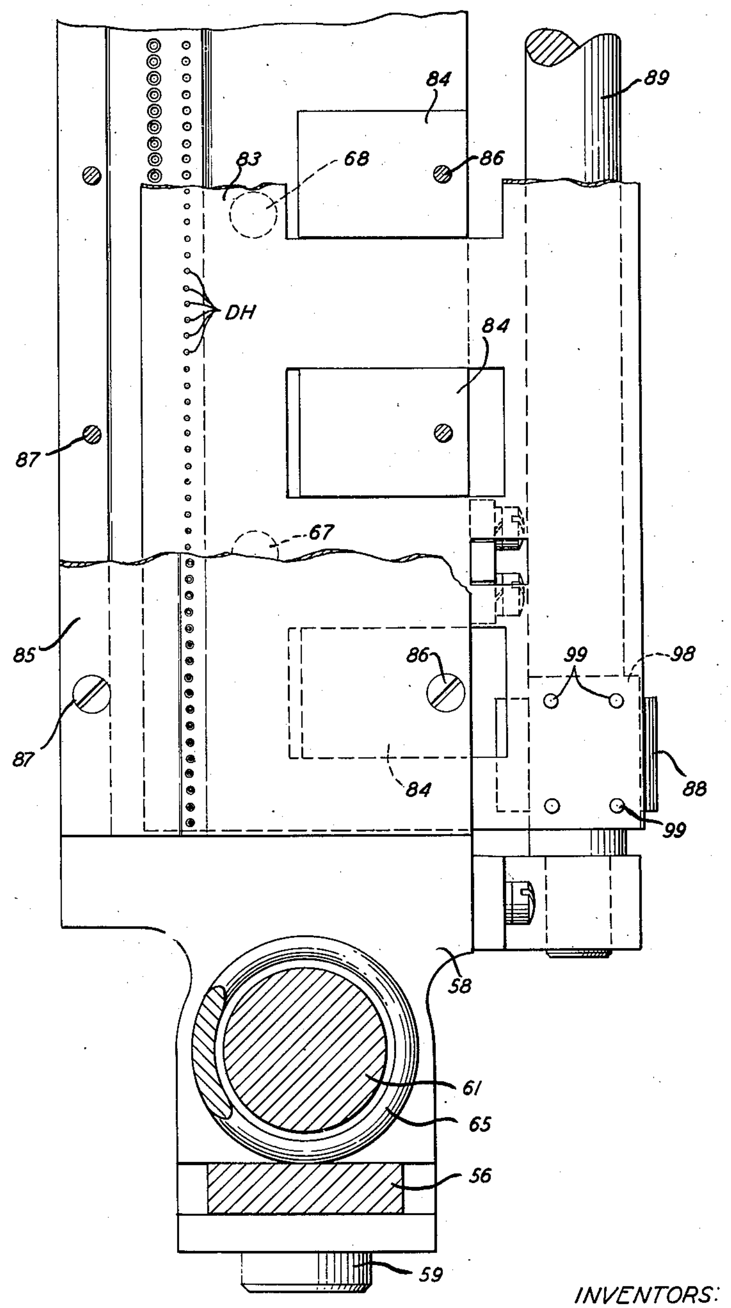
Fig. 6 is a partial view of a head piece mounting showing guiding elements for a feeder plate and its operating shaft, the head piece being shown in an inverted position.

The head piece 58 is provided with drilled holes for receiving a plurality of rods 67, 68, 69 and 70 which are held against longitudinal movement in the head piece by set screws 71, these rods serving as guides for an oblong shaped slider member 72 to the lower end of which is secured, as by a plurality of screws 79 best seen in Figs. 5 and 5A, a plunger assembly consisting of an obling bar 74 of substantially L-shaped cross-section and a strip 73 which is secured to the bar 74 by a plurality of screws 78, the bar 74 being provided with a plurality of counter bore holes for receiving a plurality of plunger members 75 and coil springs 76 which are held under normal tension by respective set screws 77 in the strip 73, the plunger assembly thus formed, is as above-mentioned, secured to the slider member 72 by screws 79.

Figure 9:
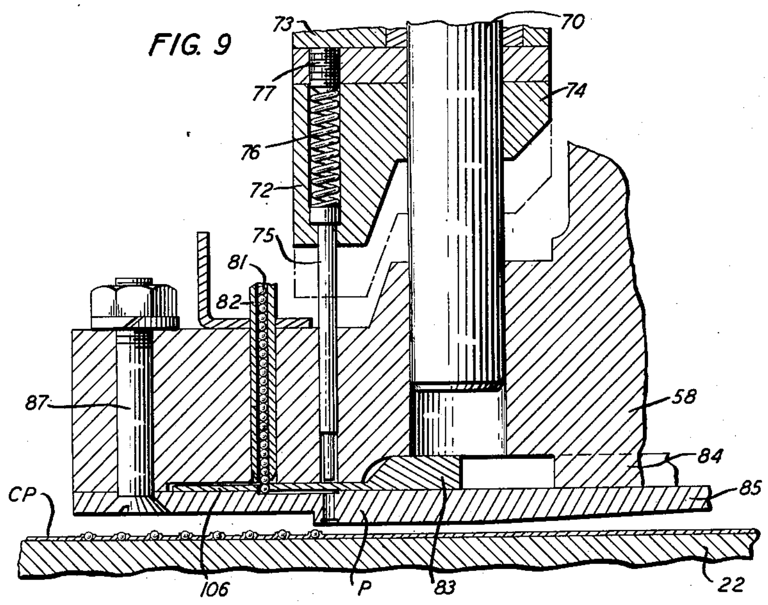
Figs. 9, 10 and 11 are partial views showing the plunger members, the feeder plate and the table for receiving the silver chloride material in different operated positions.
Figure 13:
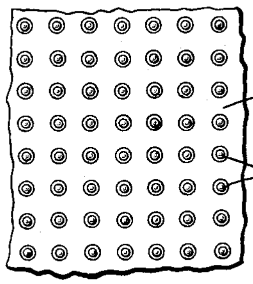
Fig. 13 is a view of a portion of a silver chloride plate having beads embedded therein according to the operation of the machine of this invention.

To the head piece 58, as best seen in Figs. 1, 4 and 5, is secured a hopper 80 containing glass beads 81, and for each plunger member 75 there is associated a tubing 82 leading the beads from the hopper 80 to registering drilled holes DH (see Fig. 6) in a feeder plate 83 mounted for reciprocating sliding movement to the underside of head piece 58, this feeder plate being guided by projections, as 84, best seen in Figs. 3, 4, 6 and 9, formed to the underside of the head piece 58, and retained in position relative to the guiding elements 84 by a plate 85 itself secured to the head piece by a plurality of bolts 86 and 87, best seen in Figs. 5 and 9, plate 85 being formed with an anvil portion P, best seen in Fig. 5, serving for pressing the silver chloride plate CP onto the table 22 at the point adjacent the plungers 75 upon the operation of the head piece 58 and, thereby, the operation of the slider member 72 and that of the plunger member 75 following the operation of the feeder plate 83 as effected by a pair of arms 88, Figs. 4 and 5, keyed on a shaft 89, journaled in bearings carried by the head piece 58 and having rollers as 100 mounted at their free ends fitted in grooves formed in L-shaped members 98 secured to the feeder plate 83, as by a number of screws 99.

The shaft 89 is actuated through the rotation of cam 37, best seen in Figs. 1 and 2, engaging a roller 91 mounted on a stud 92, laterally extending from a link member 93 of rectangular cross-section having one of its ends fitted for sliding movement in a bracket 94 secured to the rail 11 by a number of screws 101, while the opposite end of link 93 is connected to a second link member 95 by a shoulder screw 96, carried by link member 95, the link 93 having an oblong opening into which the shoulder screw 96 is fitted for permitting the small longitudinal movement of link member 93 relative to link member 95 against the tension of their retractile spring 97 provided for a purpose which will be hereinafter described in detail. The link member 95 is mounted for longitudinal sliding movement in a block member 102 secured to the upright plate 42 by a number of screws 103 while the opposite end of link 95 is operatively connected to an arm 104 keyed to the shaft 89 by a chain type link member 105, best seen in Figs. 1 and 2.

Figure 10:
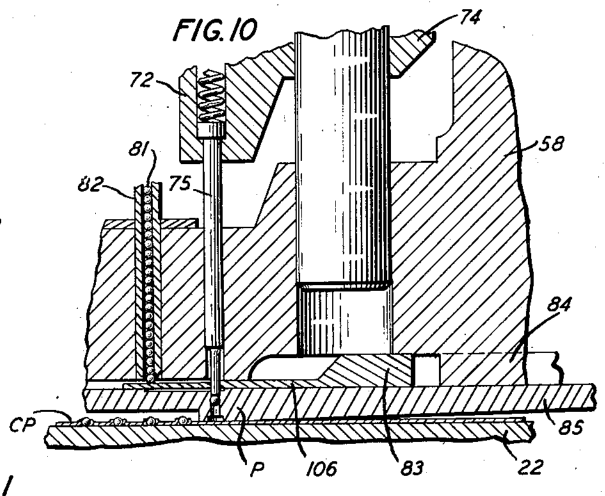
Figure 11:
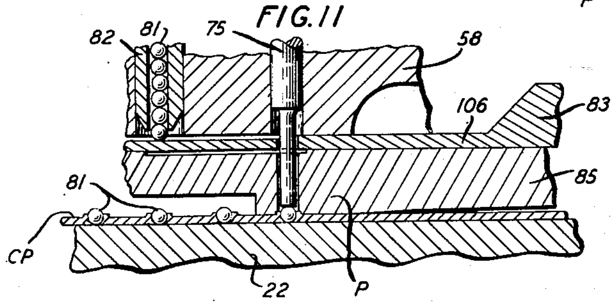

The feeder plate 83, is formed with a reduced portion 106, best seen in Figs. 5, 9, 10 and 11 of a thickness substantially that of the diameter of the glass beads 81 and, as above-mentioned, is provided with a row of drilled holes into which the glass beads fall by gravity from their guiding tubes 82 when the feeder plate is moved from the position shown in Figs. 5, 10 and 11 to the position shown in Fig. 9 by the tension of a retractile spring 110, best seen in Figs. 1 and 2, under control of cam 37 to position the glass beads in registry with their respectively associated plunger members 75 to be pressed into the silver chloride plate CP on the table 22 upon each operation of the plunger members which is followed by the movement of the table by the ratchet pawl 25 to position successive rows of beads relative to the plunger members, the retractile spring 110 for the feeder plate having one of its ends hooked to a downwardly extending lug 111 carried by link 93 and its opposite end to a bracket 112 secured to the rail 11 by a screw 113.

Figure 7:
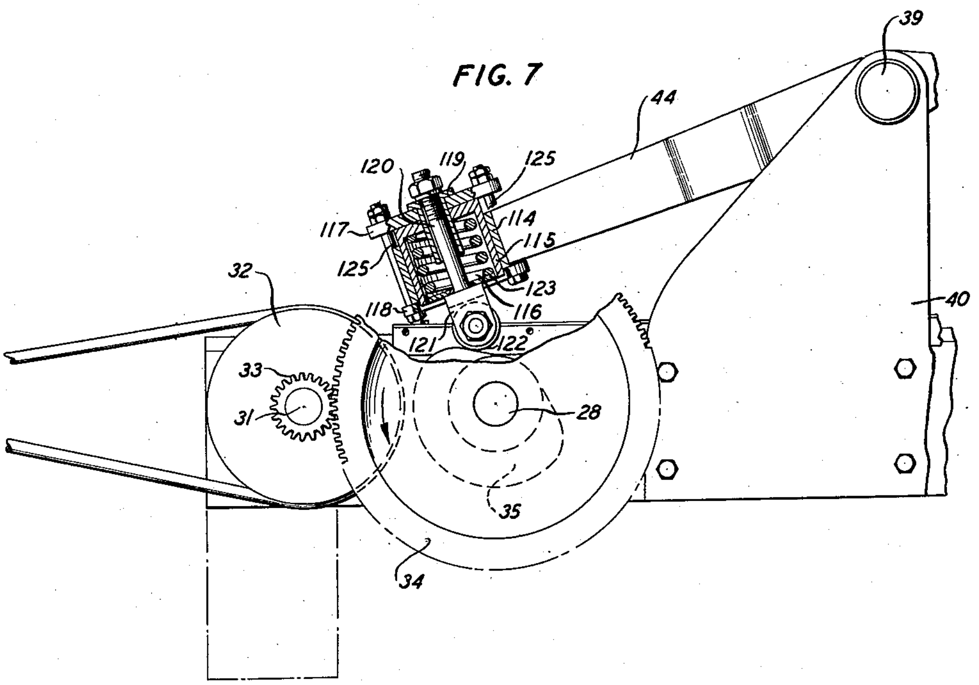
Fig. 7 is a partial view showing a cam shaft and a damping assembly for actuating the head piece and a slider element mounted thereon supporting the plunger assembly.

The arm 44 keyed on shaft 39, as best seen in Fig. 7, has its free end terminating in the form of a tubular portion 114 into which is mounted an inverted cup-shaped member 115 held in position therein by clamping elements 117 and 118 and bolts 125. The cup-shaped member 115 is provided for housing a coiled spring 116 having one of its ends bearing against the bottom wall of the cup-shaped member 115 and its opposite end bearing against a disc 123 fitted for free movement in the cup-shaped member 115 upon the movement of a fork-shaped member 121, as effected by the cam 35, member 121 having a stem portion 120 guided by a bushing 119, carried by the clamp element 117 and on the fork member 121 is mounted a roller 122 riding on the peripheral contour of cam 35 while the spring 116 serves as a damping element for the plunger actuating mechanism in addition to springs 150 housed in bushings 151 fitted into counterbore holes in the head piece 58 and compressed by the movement of studs 152 having one of their ends in screw threaded engagement in the slider piece 72 and their opposite ends terminating in the form of shoulder portions forming bearing surfaces for the adjustable screws SC. According to this construction the operation of arm 44 thus is effective to tension the springs 150 to cause a relative movement between the head piece 58 and the slider member 72 for collectively tensioning the springs 76 and thereby actuating the plunger members 75 by the tension of their respectively associated springs.

Figure 8:
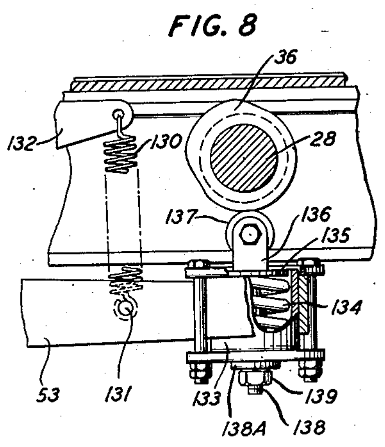
Fig. 8 is a partial view of the feeder plate actuating mechanism.
Figure 8A:
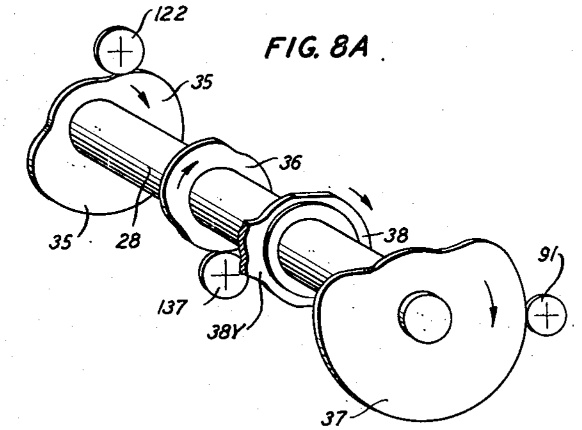
Fig. 8A is a partial view of a cam shaft showing the angular relation of the cams for actuating the plunger members, the feeder plate and a supporting table for the silver chloride material in timed relation to each other.

The head piece 58 is yieldably held in its normal raised position by a retractile spring 130, best seen in Figs. 1, 3 and 4, having one of its ends hooked to a stud 131 laterally extending from lever 53 and its opposite end hooked to an arm 132 secured to the transversely disposed spacer rail 16. Lever 53, like lever 54, is formed at its free end with a cylindrical portion CY, Figs. 1, 3, 4 and 8, for receiving a cup-shaped member 133 serving for housing a coil spring 134, best seen in Fig. 8, having one end bearing against the bottom of the cup-shaped member 133 and its opposite end against a disc 135 of a diameter slightly smaller than that of the inside diameter of the cup-shaped member 133 and fitted over the stem portion of a forked member 136 serving for mounting a roller 137 disposed for engaging the peripheral contour of cam 36 keyed on shaft 28, the stem portion of forked member 136 being fitted in a guiding sleeve 138A while a nut 139 is provided for controlling the normal tension of spring 134 which serves as a damping element for the head piece actuating mechanism.

To the pawls 25 which form a part of the ratchet mechanism for actuating the table 22, as best seen in Figs. 1 and 2, is attached one end of a cable 153 passing on grooved pulleys 154 and 155 with its opposite end attached to an arm 156 keyed on a shaft 157 journaled in bearings in rails 10 and 11 and to one end of shaft 157 is keyed a handle 158 provided for imparting a small angular movement to shaft 157 and to the arm 156 keyed thereon for disengaging the pawl 25 from rack 26 and thereby permitting the movement of table 22 as imparted manually by a handle 160, secured to the table 22 and extending in a convenient position to the front of the machine for moving the table independently of the ratchet mechanism.

In the operation of the machine of this invention for embedding glass beds in a silver chloride plate CP, for example, this silver chloride plate is secured at one of its longitudinal edges on the table 22 by the clamping strip ST under the tightening action of screws ST2, as shown in Figs. 1, 3 and 4. The rotation of cam shaft 28 as imparted by pulley 32, pinion 33 and gear wheel 34 is effective to impart a rocking movement to lever 44 and thereby to the arms 41 keyed on shaft 39 for directly actuating the slider member 72 on guiding rods 67, 68, 69 and 70 through the engagement of adjustable screws SC with the studs 152 which movement is effective to collectively tension the springs 150 following the operation of lever 53 by cam 36 and thereby the downward movement of head piece 58 operatively connected to the arms 54 keyed on shaft 55 by links 66 and 67 connecting at their upper disposed ends to the head piece 58 by studs 59 and 60. The downward movement of head piece 58, as guided by rods 61 and 62, causes the portion P of plate 85, see Fig. 5, to press the silver chloride plate CT onto the table 22.

The continued operation of slider member 72 is effective to engage the plunger members 75 with their respective glass beads now in the drilled holes or openings in the feeder plate 83 for forcing them into the silver chloride plate by the tension of springs 76 causing the silver chloride material to cold flow into the circular recesses formed in the clamping plate 85 to a point above the center of the beads to hold them imbedded in the silver chloride material. The continued operation of cam shaft 28 and the lever 44 together with arms 41 permits the slider 72 to return to normal position by the tension of springs 150 while the head piece 58 is returned to normal by the tension of retractile springs 65 and 66, thus freeing the table 22 on its slides 20 and 21 which is followed by the back and forth operation of pawl 25 by the rotation of eccentric 38 so as to impart an advancing movement to the table 22 and, therefore, to the silver chloride plate clamped thereon, which operation is continued by the movement of the feeder plate 83 as effected by the spring 110 under control of cam 37 for placing its row of drilled holes in registery with the beads guiding tubes 82 preliminary to the movement of the feeder plate for positioning the beads in registry with their respective plunger members, such movement being effected by cam 37 which, as above-mentioned, actuates the shaft 89 and arms 88 having rollers 100, see Fig. 5, operatively engaging the forked pieces 98 carried by the feeder plate, the function of spring 97 being to yieldably hold the links 95 in the retracted position while holding the roller 91 on link 93 in operative engagement with cam 37.

The movement of the feeder plate for placing the beads in registry with their operating plunger members is effected, as above-mentioned, during the tensioning of spring 110 under control of cam 37, roller 91, links 93 and 95, the lever 104 and arms 88 engaging the fork pieces 98 carried by the feeder plate and this cycle of operations is continued for each row of glass beads embedded into the silver chloride plate.

What is claimed is:

1. In a machine for embedding beads into a silver chloride plate, said machine comprising a table for receiving the silver chloride plate, a hopper for the beads, a plurality of plunger members, a feeder plate, a movable head piece having means for slidably receiving said feeder plate, said feeder plate having means for receiving a number of beads, means for guiding the beads from said hopper to said means in said feeder plate, means for actuating said feeder plate to position the beads in registry with said plunger members, means for actuating said plunger members to force said beads into the silver chloride plate, an anvil carried by said head piece for pressing the silver chloride plate against said table prior to the operation of said plunger members, and means formed in said anvil for receiving the silver chloride material cold flowed by the movement of the beads into the material for embedding the beads in the sliver chloride plate.

2. In a machine for embedding beads into a silver chloride plate, said machine comprising a movable table for receiving the silver chloride sheet, a hopper for receiving the beads, a plurality of operable plunger members, a feeder plate, said feeder plate having means for receiving a number of beads, means for guiding the beads from said hopper to said means in said feeder plate, means for actuating said feeder plate to position a corresponding number of beads in registry with said plunger members, a mechanism operable for pressing the silver chloride sheet on said table and actuating said plunger members to force the beads in said silver chloride, means carried by an element of said mechanism for causing the material to cold flow around the beads beyond their equatorial line for embedding them in the material and means for successively actuating said table following the operation of said plunger members.

3. In a machine for embedding beads of insulating material into a plate of silver chloride material, said machine comprising a movable table for receiving the silver chloride plate, a plurality of longitudinally movable plunger members arranged in a row, a hopper containing the beads, a feeder plate having means disposed in a row for receiving a number of the beads, means for guiding the beads from said hopper to said means in said feeder plate, means operable for securing the silver chloride plate on said table prior to the operation of said plunger members, means formed into said operable means to cause the silver chloride material to cold flow around the beads in a direction opposite the direction of movement of said plunger members and at a point beyond their equatorial line for embedding the beads into the silver chloride material, a ratchet mechanism for operating said table following the return movement of said plunger members to normal, and a cam shaft operable for actuating said securing means, said plunger members, said ratchet mechanism and said feeder plate.

4. In a machine for embedding beads into a piece of material, said machine comprising a frame, a table mounted for movement on said frame, a movable head piece, means carried by said frame for guiding said head piece in a direction perpendicular to the plane of movement of said table, spring means for yieldably holding said head piece in normal position, a slider member mounted on said head piece for movement relative thereto, spring means for yieldably holding said slider member in normal position on said head piece, a plurality of plunger members carried by said slider member, spring means individual to said plunger members for holding them in retracted position, a movable feeder plate, guiding means for said feeder plate formed with said head piece, means secured to said head piece for holding said feeder plate in position in said guiding means, said holding means having counterbore holes registering with said plunger members into which the material cold flows beyond the center of the beads upon the forcing of the latter into the material, a shaft, a cam on said shaft for actuating said head piece for compressing each of said springs to operate said plunger members and means on said cam shaft for actuating said feeder plate in timed relation with said plunger members.

5. In a machine for embedding glass beads in a plate of silver chloride material, a plurality of plunger members, a rotatable cam, a shaft, a lever member keyed on said shaft, a plurality of arms keyed on said shaft for operation by the movement of said lever member under control of said cam, means disposed in operative relation with said arms for actuating said plunger members to force a corresponding number of beads in the silver chloride material, a damping device operatively connecting said lever member to said cam, said device comprising a cup-shaped member carried by said lever member, a clamping device for holding said cup-shaped member on said lever member, a bushing extending into said cup-shaped member, a rod fitted for longitudinal movement in said bushing, said rod having a forked portion, a roller pivoted between the prongs of said forked portion and riding on the peripheral contour of said cam, a disc having a centrally located opening fitted on said rod and resting against the forked portion formed with said rod and a spring in said cup-shaped member compressed by the operation of said rod by said cam for actuating said plunger members.

EDGAR W. GENT.
WALTER W. WERRING.

REFERENCES CITED

The following references are of record in the file of this patent:

UNITED STATES PATENTS

| Number | Name | Date |
|---|---|---|
| 1,207,964 | Mahler | Dec. 12, 1916 |
| 1,424,920 | Kintzele et al. | Aug. 8, 1922 |
| 2,181,573 | Bunker | Nov. 28, 1939 |
| 2,369,466 | Kylin et al. | Feb. 13, 1945 |